United States Patent [19]

Yamazaki

[11] Patent Number: 4,561,080
[45] Date of Patent: Dec. 24, 1985

[54] AUTOMATIC FOCUSING DEVICE IN AN OPTICAL TYPE DATA REPRODUCING APPARATUS

[75] Inventor: Shohei Yamazaki, Hamamatsu, Japan

[73] Assignee: Nippon Gakki Seizo Kabushiki Kaisha, Hamamatsu, Japan

[21] Appl. No.: 451,889

[22] Filed: Dec. 21, 1982

[30] Foreign Application Priority Data

Dec. 24, 1981 [JP] Japan ............................ 56-194363[U]

[51] Int. Cl.⁴ .......................... G11B 7/00; G11B 21/02
[52] U.S. Cl. ........................................ 369/45; 250/201
[58] Field of Search .................... 358/342; 369/44, 45, 369/46; 250/201–204, 201 DF

[56] References Cited

U.S. PATENT DOCUMENTS 3,932,700  1/1976  Snopko ................................. 369/45
4,243,848  1/1981  Utsumi ................................. 369/45

*Primary Examiner*—Robert L. Richardson
*Attorney, Agent, or Firm*—Spensley Horn Jubas & Lubitz

[57] ABSTRACT

An automatic focusing device in an optical type data reproducing apparatus is capable of restoring an objective lens to a position in which a servo controlling system can perform a normal servo control, when the servo controlling system has entered a divergent state. In the device, a photodetector produces a detection signal corresponding to a relative distance between the objective lens and a disk and, in response to this detection signal, the servo controlling system automatically controls the relative distance between the objective lens and the disk so as to form a focal point on a signal plane of the disk. If the objective lens has entered a region in which the servo controlling system has deviated from a converging range and entered divergence, this divergent state is detected in response to the level of an integrated signal of the detection signal from the photodetector and thereupon the objective lens is forcibly moved to a position in which the servo controlling system can perform a normal servo control.

7 Claims, 7 Drawing Figures

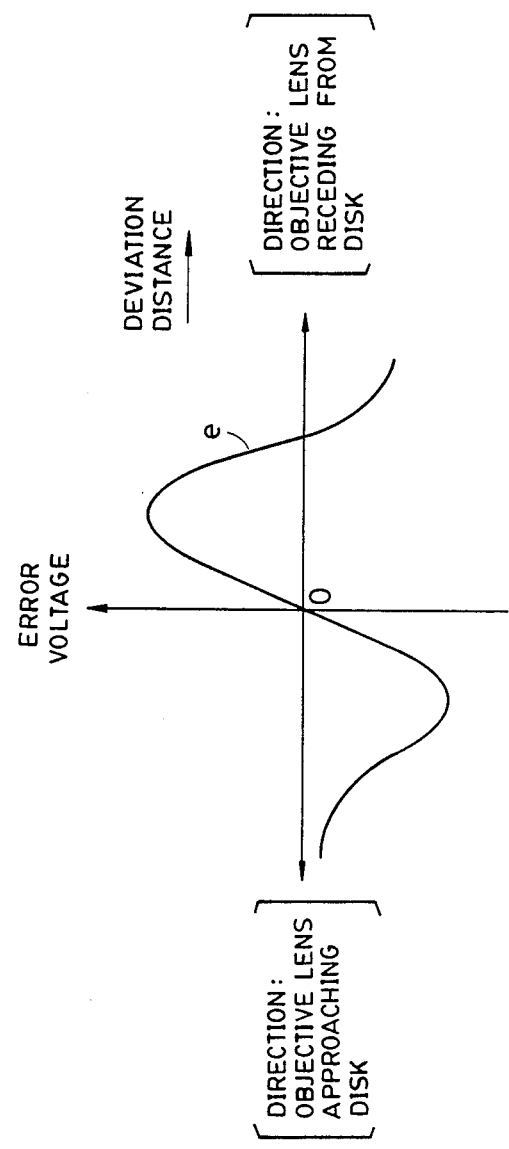

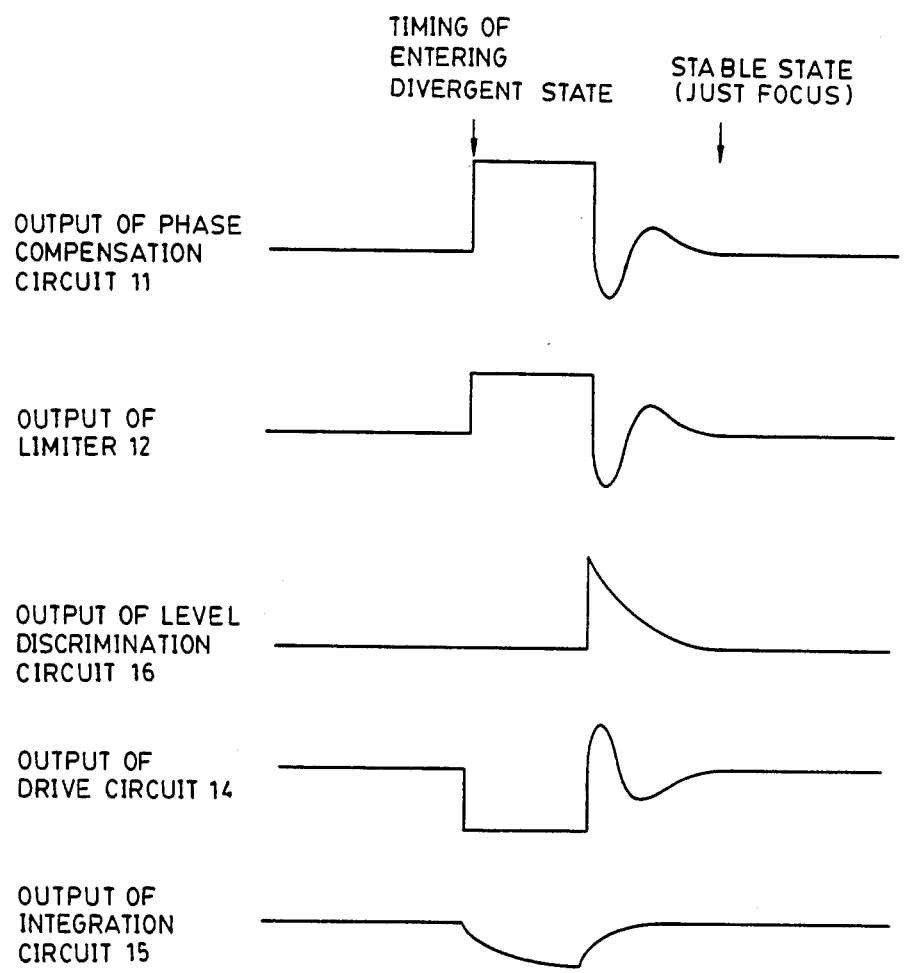

AUTOMATIC FOCUSING DEVICE IN AN OPTICAL TYPE DATA REPRODUCING APPARATUS

BACKGROUND AND SUMMARY OF THE INVENTION

This invention relates to an improvement in a focusing servo control for an optical type data reproducing apparatus such as a video disk player and an audio disk player.

A method utilizing astigmatism as shown in FIG. 1(a) is generally employed for correcting out-of-focusing which occurs due to distortion of the disk or a surface vibration of the disk. According to this method, light A reflected from a disk 1 is caused to produce astigmatism through a cylindrical lens 2, sums of incident light beams in respective diagonal quarter regions in a 4-split photodetector 3 are detected by utilizing the phenomenon that the shape of the light received by the photodetector 3 changes as a, i.e., circle (just focus), b and c, i.e., ellipses in different directions (vertically out of focus) in accordance with a vertical position of the disk 1 relative to the focal plane, difference between these sums of the incident light beams is calculated to obtain voltage corresponding to distance between an objective lens 5 and the disk 1 as shown in FIG. 1(b), and a drive coil 4 is driven by this voltage to move the objective lens 5 and thereby to correct the out-of-focusing.

However, characteristics of a focusing error signal of a commercially available 4-split photodetector are such that, as shown in FIG. 2, the error signal is not symmetrical with respect to the zero point (i.e., just focus) but it is inverted to a negative side in a region which is further from a region e toward a direction going away from the just focus. For this reason, in the focus servo shown in FIG. 1(a), the focusing error signal enters a divergent state i.e., a state in which the focus is far away from the just focus, in a region further away from the region e.

It is, therefore, an object of the present invention to provide an automatic focusing device in an optical type data reproducing apparatus capable of accurately restoring the error signal to a region in which it is adjustable by the focus servo if the error signal enters the divergent state in the characteristics as shown in FIG. 2. According to the invention, the divergent state can be detected by examining whether the error signal is maintained or not in a negative value above a predetermined period of time. If the error signal is within a region in which it can be pulled back to a right position by the servo control (hereinafter referred to as "servo pulling back region"), an integration signal of the error signal is small because the error signal will be momentarily pulled back to the just focus by the servo control. If the error signal has entered the divergent state, the error signal remains a negative value in a relative long period of time because it is out of the servo control range with a result that the integration signal of the error signal becomes a large value. Accordingly, the divergent state can be detected by examining the level of the integration signal of the error signal. Upon detection of the divergent state, an accurate pulling back of the error signal can be again realized by forcibly moving the objective lens to the servo pulling back region.

BRIEF DESCRIPTION OF THE DRAWINGS

In the accompanying drawings;

FIG. 2 is a graphical diagram showing an example of characteristics of a commercially available 4-split photodetector;

FIG. 6 is a diagram showing waveforms of signals appearing in the circuit of FIG. 5.

DESCRIPTION OF A PREFERRED EMBODIMENT

Figure 1A:
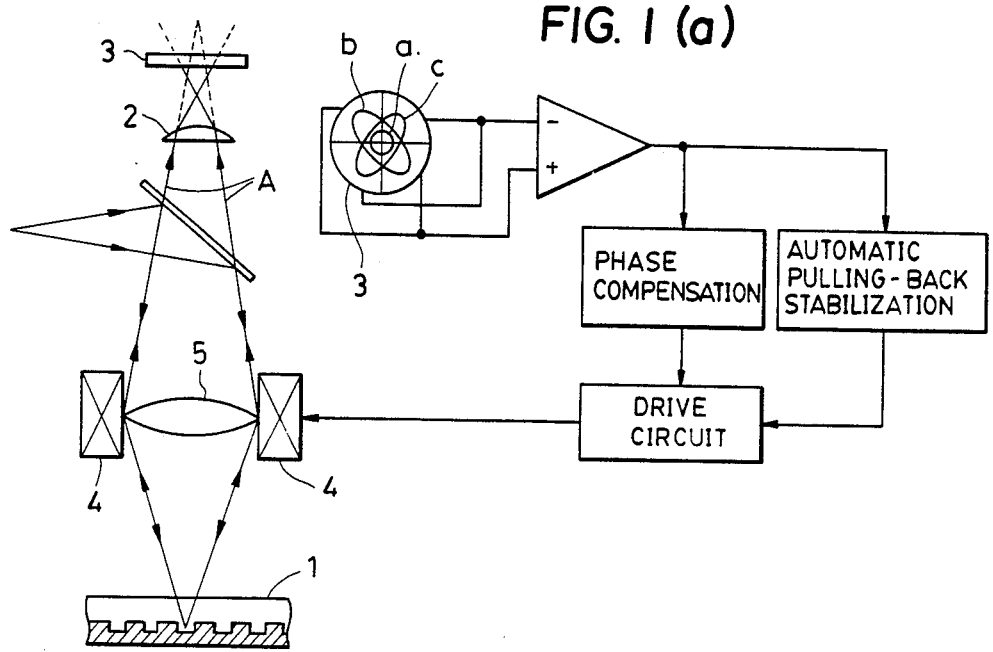
FIG. 1(a) is a block diagram showing a prior art automatic focusing device in an optical type data reproducing apparatus.
Figure 1B:
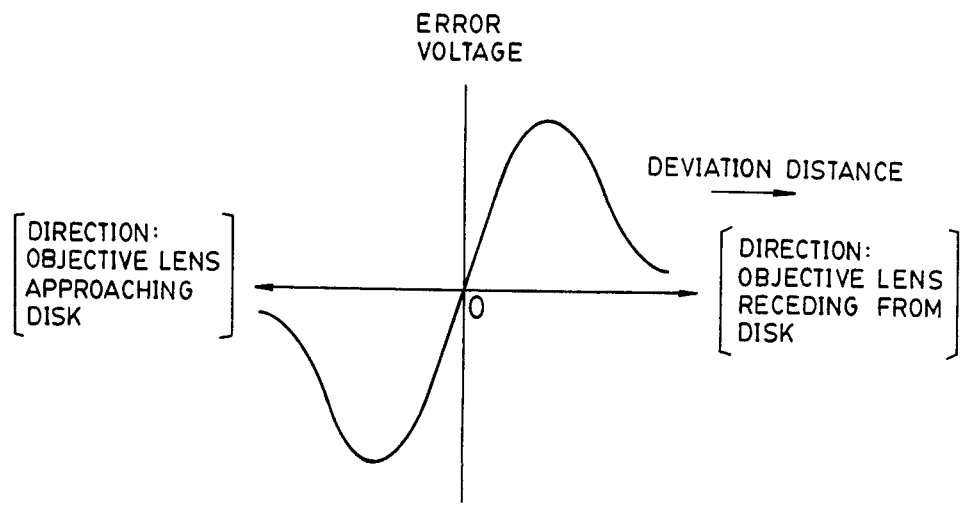
FIG. 1(b) is a graphical diagram showing desirable characteristics of a focusing error signal produced in the device shown in FIG. 1(a)
Figure 3:
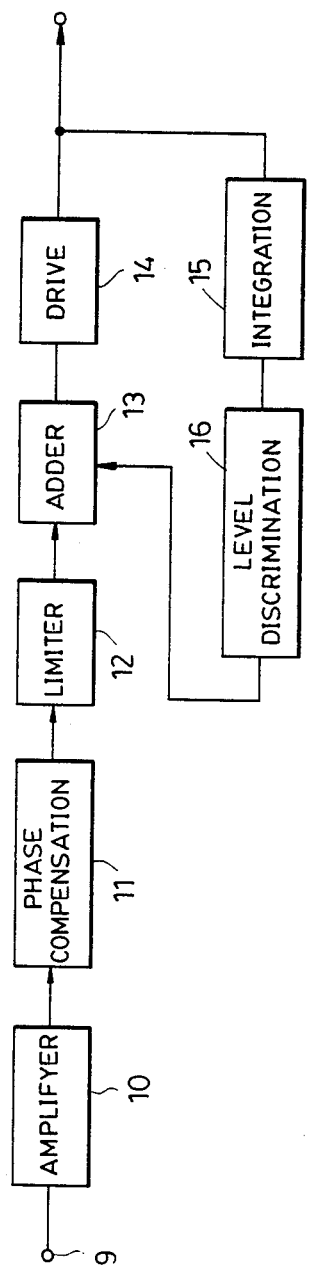
FIG. 3 is a block diagram showing an embodiment of the automatic focusing device according to the invention.

Referring to FIG. 3, a focusing error signal applied to an input terminal 9 is amplified by a necessary amount by an amplifier circuit 10. The focusing error signal thereafter is compensated in phase by a phase compensation circuit 11 for securing a stable operation of a focus servo loop and is limited in amplitude by a limiter 12 with respect to its entire region or its low frequency region including a direct current. It should be noted that the function of the limiter 12 may be performed by a circuit in which an amplitude limitation is applied by a power voltage. An output of the limiter 12 is applied to an adder 13 where it is added with an output of a level discrimination circuit 16 to be described later and thereafter is used to drive the object of control, i.e., the objective lens, through a drive circuit 14.

An output of the drive circuit 14 is applied also to an integration circuit 15 and is integrated by the integration circuit 15. The level discrimination circuit 16 receives the integration output of the integration circuit 15, and makes the judgement that the focusing error signal has entered the divergent state when the level of the integrated value has reached a predetermined threshold value. Thereupon, the level discrimination circuit 16 produces an output signal for driving the objective lens toward the disk. This signal is added in the adder 13 to the error signal from the limiter 12 whereby the objective lens is forcibly moved to the servo pulling back region and the divergent state is eliminated.

Figure 4:
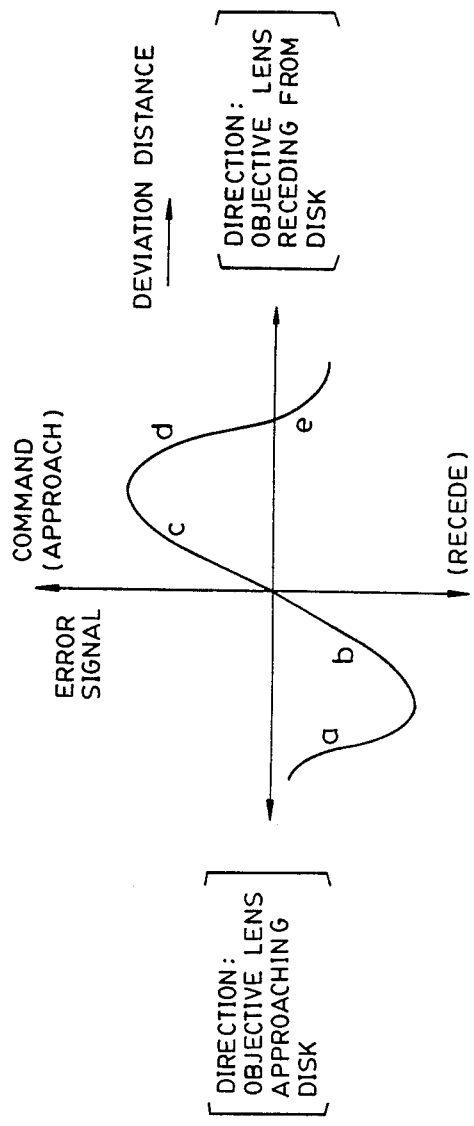
FIG. 4 is a graphical diagram showing relationship between characteristics of input signals in the device shown in FIG. 3 and focus servo commands.

An example of the operation of the circuit shown in FIG. 3 will now be described with reference to FIG. 4. In FIG. 4, a crossing point of the vertical and horizontal axes is a target position (just focus) in a servo control. If the polarity of the focusing error signal is positive, a command "approach" is issued whereas if it is negative, a command "recede" is issued. In the example of FIG. 4, in a region in which the objective lens is in an approached state to the disk, the error signal is not inverted to a polarity in which the command "approach" is issued, i.e., the positive polarity, even if the objective lens is caused to approach the disk as near as the mechanical and circuit constructions thereof allow it. On the other hand, in a region in which the objective lens is in a receded state from the disk, a focusing error signal of a polarity in which the command "approach" is issued is outputted within a certain error range but the error signal is inverted when it has gone out of this error range and entered the region e, causing the command "recede" to be issued despite the fact that the objective lens has already receded too far from the disk.

In a state where the relationship between the objective lens and the disk is within region a, b, c or d in FIG. 4, the objective lens or the error signal can be converged to the zero point (just focus) by the focus servo control. If, however, the relationship between the objective lens and the disk is in the region e, the objective lens is caused by the focus servo control to recede from the disk as far as the mechanical and circuit constructions thereof allow it and thereby enters the divergent state. At this time, the control signal being outputted from the drive circuit 14 is "recede". The limiter 12 at this time is in an amplitude limitation mode. Upon lapse of a certain period of time, the divergent state is detected by the integration circut 15 and the level discrimination circuit 16.

The level discrimination circuit 16 applies an output zero to the adder 13 in a normal control state and, upon detection of the divergent state, produces an output voltage for cancelling the output of the limiter 12 which is in the amplitude limitation mode. By the addition of the outputs of the level discrimination circuit 16 and the limiter 12, the focusing error signal is forcibly pulled back to one of the regions a, b, c and d. Thereafter, the output of the level discrimination circuit 16 is restored to zero which is the output of the normal control state in which the focus servo loop operates with the point 0 as its target position. The restoration of the output of the level discrimination circuit 16 to the normal control state should be slower than the response speed of the focus servo loop, i.e., outputting of signal for cancelling the limiter output from the level discrimination circuit 16 should be maintained until the focusing error signal has been pulled back to one of the regions, a, b, c and d.

Figure 5:
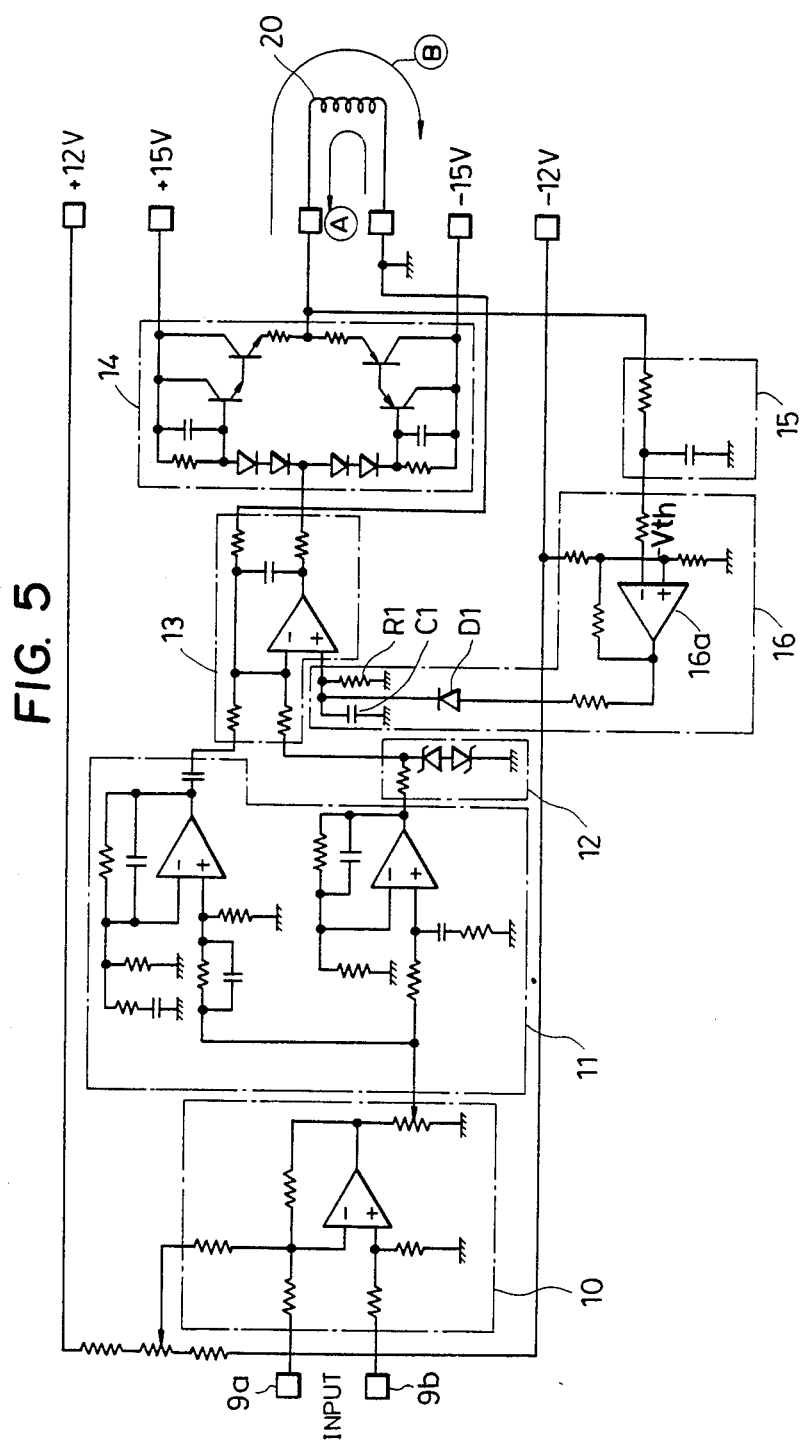
FIG. 5 is a circuit diagram showing an example of a specific circuit of the device shown in FIG. 3.

FIG. 5 shows a concrete circuit diagram of the circuit of FIG. 3. Respective sum signals of diagonal elements of the 4-split photodetector are applied to input terminals 9a and 9b. These sum signals are applied to the amplifier circuit 10 composed in the form of a differential amplifier. A difference signal having a polarity opposite to the error signal shown in FIG. 4 is produced by the amplifier circuit 10. This difference signal is applied to an inverting input terminal of the adder 13 through the phase compensation circuit 11 and the limiter 12. Voltage at a non-inverting input terminal of the adder 13 is zero in the normal control state in which no signal is outputted from the level discrimination circuit 16 so that the adder 13 outputs a signal which is inversion of the output of the phase compensation circuit 11. The output of the adder 13 drives the drive circuit 14 composed in a push-pull amplifier to supply a control current to a drive coil 20 of the objective lens. The output of the drive circuit 14 on the other hand is integrated by the integration circuit 15. The level discrimination circuit 16 receives the integrated value at its inverting input terminal and a reference voltage (voltage which is equivalent to one appearing in the divergent state) -Vth at its non-inverting input terminal, receives these input signals together and outputs a positive voltage if the integrated value is greater than the reference value-Vth. This positive voltage is applied to the non-inverting input terminal of the adder 13 through a diode $D_1$. If the integrated value is smaller than the reference voltage-Vth, a Schmitt circuit 16a of the level discrimination circuit 16 outputs a negative voltage. This voltage, however, is interrupted by the diode $D_1$ and is not applied to the non-inverting input terminal of the adder 13. A capacitor C1 is connected to the non-inverting input terminal of the adder 13 for continuing supply of voltage to the non-inverting input of the adder 13 when the supply of the voltage from the diode $D_1$ is stopped and thereby ensuring pulling back of the error signal to the servo pulling back region.

The operation of the circuit shown in FIG. 5 will now be described.

(A) OPERATION WITHIN THE SERVO PULLING BACK REGION

In the servo pulling back region, the difference voltage outputted by the amplifier 10 is supplied to the drive circuit 14 through the phase compensation circuit 11, limiter 12 and adder 13. The drive circuit 14 is thereby driven to supply the control current to the objective lens drive coil 20 and instantly correct the deviation of the focal point from the disk surface. If in this case the objective lens 5 is in a position approaching the disk 1 (position a or b), the polarity of the output of the amplifier circuit 10 is positive and the input of the adder 13 is also positive. The output of the adder 13 therefore is negative and the control current flows in the direction of arrow A. Conversely, if the objective lens 5 is in a position receding from the disk (position c or d), the control current flows in the direction of arrow B.

Since deviation from the focal point can be instantly corrected in the servo pulling back region, the output level of the integration circuit 15 remains low and the output of the level discrimination circuit 16 remains zero.

(B) OPERATION IN THE DIVERGENT STATE

If deviation of the focal point from the disk surface has shifted to the region e in FIG. 4 which is out of the servo pulling back region, the polarity of the output of the amplifier circuit 10 is inverted to a positive one which is the same as in the deviation in which the objective lens 5 is approaching the disk 1. The input of the adder 13 is also positive. Accordingly, the output of the adder 13 becomes negative and the control current flows in the direction of the arrow A. The lens 5 therefore is driven in the direction in which it further recedes from the disk and brought into the divergent state. The output of the integration circuit 15 in this case increases in the negative direction and, when it has exceeded the reference voltage-Vth of the level discrimination circuit 16, the level discrimination circuit 16 produces a positive voltage. This voltage is larger than voltage applied to the inverting input terminal of the adder 13 so that the adder 13 produces a positive voltage and the direction of the control current applied to the drive coil is inverted to the one shown by the arrow B. The objective lens 5 therefore is forcibly driven toward the disk so that the error signal comes in the servo pulling region shown in FIG. 4. At this time, charge in the integration circuit 15 is discharged and the output of the Schmitt circuit 16a of the level discrimination circuit 16 falls before the objective lens 5 is pulled back to the servo pulling back region. Since, however, charge in the capacitor C1 is discharged through a resistor R1, the adder 13 continues its addition during a certain length of time. The objective lens 5 therefore is accurately pulled back to the servo pulling back region. The waveforms appearing in the respective component parts of the circuit shown in FIG. 5 in the divergent state are illustrated in FIG. 6.

I claim:

1. An automatic focusing device in an optical type data reproducing apparatus comprising:

a photodetector producing a detection signal corresponding to a relative distance between an objective lens and a disk;

servo controlling means responsive to the detection signal from said photodetector for automatically controlling the relative distance between the objective lens and the disk so that a focal point is formed on a signal plane of the disk to achieve correct focus, said servo controlling means having a converging state in which proper servo control is achieved and a divergent state in which said servo controlling means operates to cause relative movement between the objective lens and disk in a direction away from correct focus;

divergent state detection means for detecting when said servo controlling means has deviated from the converging state and entered the divergent state; and compulsory pull-back means for forcibly moving, upon detection of the divergent state of said servo controlling means by said divergent state detection means, said objective lens at least to a position in which said servo controlling means can perform a normal servo control.

2. An automatic focusing device as defined in claim 1, in which said divergent state detection means detects the divergent state of said servo controlling means in response to the level of an integrated signal of the detection signal from said photodetector.

3. An automatic focusing device as defined in claim 2, in which said servo controlling means comprises a drive circuit which moves the position of the objective lens in response to the detection signal from said photodetector and in which said divergent state detection means comprises a charging and discharging circuit which integrates the detection signal by charging and discharging the output of said drive circuit and a comparison circuit which compares the output of said charging and discharging circuit with a reference threshold value and outputs a divergent state detection signal when the output of said charging and discharging circuit has exceeded the threshold value.

4. An automatic focusing device as defined in claim 3, in which said compulsory pull-back means comprises an addition circuit which adds the detection signal from said photodetector and the divergent state detection signal from said comparison circuit together and provides, upon detection of the divergent state of said servo controlling means by said divergent state detection means, said drive circuit with a signal for forcibly moving the objective lens to the position in which said servo controlling means can perform the normal servo control.

5. An automatic focusing device as defined in claim 4 further comprising:

an amplifier circuit which voltage-amplifies the detection signal from said photodetector;

a phase compensation circuit for compensating for the phase of the voltage-amplified detection signal from said amplifier circuit; and an amplitude limitation circuit for amplitude-limiting the output of said phase compensation circuit.

6. An automatic focusing device as defined in claim 1, in which said photodetector has a characteristic having a region in which it does not produce a detection signal of a sigmoid characteristic with respect to the relative distance between the objective lens and the disk.

7. An automatic focusing device in an optical type data reproducing apparatus comprising:

a photodetector producing a focusing error signal having a polarity indicative of a relative direction of movement necessary between an objective lens and a disk so that proper focus of the objective lens with respect to the disk is achieved, said photodetector having the characteristic that the focusing error signal includes a divergent state in which its polarity corresponds to a direction of movement which would move the lens and disk away from proper focus;

servo controlling means responsive to the focusing error signal from said photodetector for automatically controlling the relative distance between the objective lens and the disk so that proper focus is achieved;

divergent state detection means for detecting when said servo controlling means is operating in response to the focusing error signal while in its divergent state; and compulsory pull-back means for forcibly moving, upon said detection by said divergent state detection means, said objective lens at least to a position in which said servo controlling means can perform a normal servo control.

* * * * *